United States Patent [19]

Kim

[11] Patent Number: 4,574,229

[45] Date of Patent: Mar. 4, 1986

[54] POWER EFFICIENT MOTOR STARTER AND CIRCUIT BREAKER FOR AN INDUCTION MOTOR

[76] Inventor: In S. Kim, Samig Apart 10 - dong 615, Cheongdam - dong Kangnam - Ku, Seoul, Rep. of Korea

[21] Appl. No.: 565,870

[22] Filed: Dec. 27, 1983

[30] Foreign Application Priority Data

Oct. 20, 1983 [KR] Rep. of Korea .................. 82-4954
Nov. 30, 1983 [KR] Rep. of Korea ............ 83-10159[U]
Dec. 29, 1983 [KR] Rep. of Korea ............ 82-10514[U]

[51] Int. Cl.$^4$ .................. H02P 1/24; H02H 7/085
[52] U.S. Cl. .................. 318/788; 318/783; 318/792; 361/24; 361/27
[58] Field of Search .......... 318/786, 787, 788, 782, 318/783, 792; 361/24, 27

[56] References Cited

U.S. PATENT DOCUMENTS

| | | | |
|---|---|---|---|
| Re. 31,367 | 10/1983 | d'Entremont | 318/778 |
| 3,112,384 | 11/1963 | Bodge | 318/782 |
| 3,424,964 | 1/1969 | Bacon | 318/782 |
| 3,657,619 | 4/1972 | Love | 318/787 |
| 4,161,681 | 7/1979 | Rathje | 318/792 |
| 4,237,508 | 12/1980 | Woods et al. | 361/24 |
| 4,422,120 | 12/1983 | Kobayashi | 361/27 |

*Primary Examiner*—David Smith, Jr.

*Attorney, Agent, or Firm*—Birch, Stewart, Kolasch & Birch

[57] ABSTRACT

A motor starter and protection circuit is disclosed wherein a bimetallic contact support supports moveable contacts which are electrically interconnected with stationary contacts during normal non-overload conditions. Current from the power support passes through the stationary moveable contact sets as well as the bimetallic contact support and through the main coil of the motor. A positive temperature coefficient resistance is mounted on the contact support in electrical interconnection therewith. Current passes through this resistance, a TRIAC, and the motor starting winding. Conduction of the TRIAC is controlled by sensing the current which passes through the main motor coil. Only when the current passing through the main coil is substantially greater than normal load current is the TRIAC gated into conduction. A phase control capacitance is interposed between the coil sensing current through the main coil of the motor and the TRIAC gate. This capacitance ensures substantially complete conduction of the TRIAC when gated ON. The mounting of the positive temperature coefficient resistance directly on the contact support ensures good thermal transfer of the heat generated by this resistance and also maintains this resistance heated during normal operation after starting due to heat developed within the bimetallic contact support.

6 Claims, 10 Drawing Figures

POWER EFFICIENT MOTOR STARTER AND CIRCUIT BREAKER FOR AN INDUCTION MOTOR

SUMMARY OF THE INVENTION

The present invention is directed to a combined circuit breaker of a power saving style and starter apparatus formed in one body to obtain a power savings by removing the resistances all together which were heretofore needed separately as well as to provide a compact starter apparatus of a single—phase induction motor.

The present invention facilitates the control of an electric overcurrent. The ON-OFF operation of the circuit is performed by a bimetal element and in case of an over load, the overheating of the bimetal closes it tightly to the upper side. The above said operation is performed by a high positive coefficient thermistor or by a resistance heat material, as the power source is effectively disconnected by the P.C.T during movement, the existing resistance loss of the overloaded apparatus and the existing resistance loss of the starter apparatus is reduced. The device of the present invention improves a characteristic of a restarting thereof which is a distinguishing mark of the said invention.

BACKGROUND OF THE INVENTION

Figure 2:
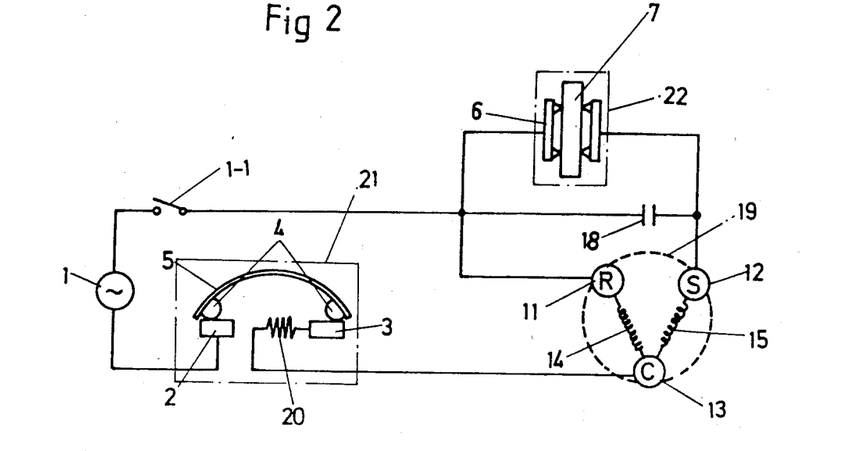
FIG. 2 is a view of a conventional circuit.

Up to now, such an overload circuit breaker and starter apparatus, as shown in the FIG. 2, wasted electric power because of the presence of a high resistance state (increasing from 20Ω to several millions Ω) and the continuous inflow of current into the P.C.T 7 after a starting of a motor. In case of a momentary interruption of the power source, a loss in the starting capability of the motor was experienced and a restriction current (a starting current) flowed continuously into a motor, accordingly providing the motor with excessive power as well as developing an electric power loss, finally shortening the life span of the apparatus.

At this time, the nichrome resistance 20 of the overload circuit breaker 21 generates heat, and before it is cut off by an operation of the bimetal 5, not only is much electric power lost but also a continuous resistance loss appeared due to the resistance 20 even during driving of the circuit.

DETAILED DESCRIPTION OF THE PREFERRED EMBODIMENTS

In the above mentioned figures, items 2,3 are the circuit breaker terminals of the said invention, items 4 are the fish eye contacts, item 5 is the bimetal of a DISC type, item 6 is the contact tension spring plate, item 7 is the positive characteristic thermistor of resistance calorific material, item 8 is the TRIAC, item 9 is the current establishment resistance, item 10 is the current transformer, item 11 is the master coil socket terminal of the induction motor, item 12 is the starter coil socket terminal, item 13 is the common line socket terminal, item 14 is the master coil, item 15 is the starter coil.

As further illustrated in these figures, item 16 is the bolt used for driving time controll covered with an insulator cap nut, item 17 is the synthetic resin frame of the starter apparatus, item 18 is the driving condenser, item 18-1 is the phase control capacitor, item 19 is the induction motor, item 20 is the nichrome heater, item 21 is the overload circuit breaker, item 22 is the motor starting P.C.T, resistance, and item 23 reset button coated with an insulator.

The present invention combines a circuit breaker of a power saving style with a starter apparatus in one body and aims to obtain a power saving acquired by removing the resistances in total which were heretofore used separately to obtain a starter apparatus of single—phase induction motor, which apparatus itself being constructed in a compact form.

The present invention controls electric over-current. The ON-OFF operation of the circuit is performed by the bimetal and in case of an overload, the overheating of the bimetal closes it tightly to the upper side and then the above said operation is performed by a high P.C.T. or by a resistance heat material, as the P.C.T. power source is cut off by means of the TRIAC. During driving of the mortar, the existing resistance loss of the overloaded prevention apparatus and the existing resistance loss of the starter apparatus is reduced, thus improving characteristics of the restarting thereof, a distinguishing mark of the present invention.

Up to now, such an overload circuit breaker and a starter apparatus, as shown in the FIG. 2, wasted power because of an appearance of a high resistance (increasing from 20Ω to several millions Ω) wasting an electric power through a continuous inflow of a current through the P.C.T. 7 after starting of the motor. In the case of a momentary disconnection of a power source, a loss the starting capability occurs and a restriction current (a starting current) flows continuously into the motor, accordingly it gives the motor excessive power as well as developing an electric power loss, and the result finally shortens the life span of apparatus.

During operation, the nichrome resistance 20 of the overload circuit breaker 21 generates heat, and before it is cut off by an operation of the bimetal 5 much electric power is lost. Additionally a continuous resistance loss appears in the resistance 20 even during motor driving.

The present invention overcomes all the above the present defects, namely, the said invention reduces cost by a novel way to integrate the starting relay 22 and the over-load circuit breaker 21 into one object which operates efficiently and occupies little space and further avoids the resistance loss of the P.C.T. 7 and the heat loss of the resistance 20, and accordingly the restarting may be accomplished normally. As a result the motor may be started in a shorter time and because of this fact, a power saving effect as well as an extension of the life span of the motor results.

In a single-phase induction motor the starting coil 15 operates only when the motor must develop a rotating power for starting and this coil is disconnected by the starting relay 22 after starting of the motor.

Before the P.C.T. relay 22 was developed a centrifugal switch or a current type relay was used, but these elements are disadvantageous because of their mechanical operation.

In the P.C.T., mechanical and contact problems do not occur, but such a P.C.T. has about a 20–30Ω resistance under a normal temperature and, if it meets a inflowing current, the temperature of the thermistor 7 rises to about 150° C. and at the same time the resistance value increases to several millions Ω. On the other hand when the current decreases to several milliamperes, the resistance decreases to a necessary value so as to maintain continuously a 150° temperature, thereby continuously developing an electric power loss on the order of 3 W.

In this conventional circuit, high resistance state of the P.C.T. 7 is, in effect, the same as when the starting coil is disconnected from the power source with a switch. Accordingly it is impossible to restart the motor before the P.C.T. 7 cools (about 90 seconds) and in this case a high current in excess to that required flows hereon and as a result it gives the power source an excess current draw and shortens the life span of the motor as well as reducing electric power loss, a most important concern today.

Figure 1:
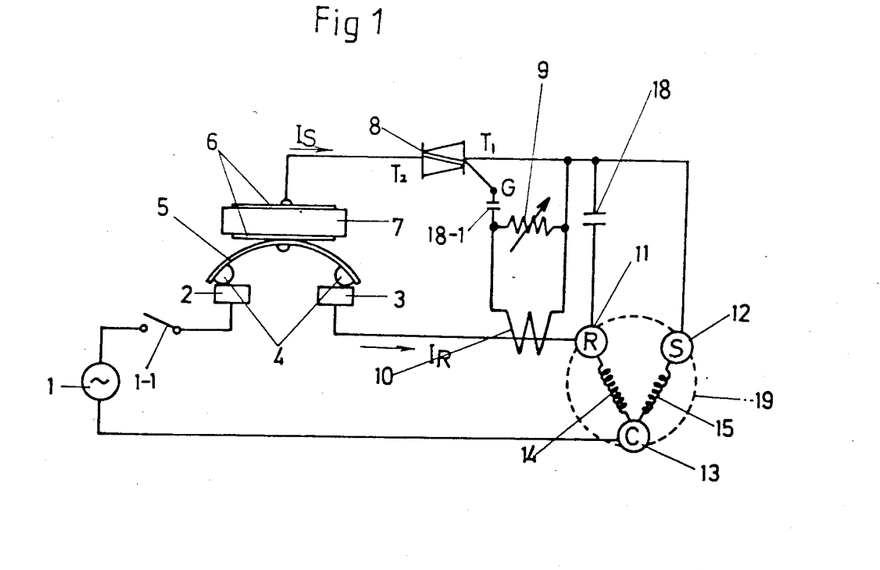
FIG. 1 is the fundamental circuit view of the present invention.

In order to solve the above mentioned problems, a phosphor spring plate 6 is mounted on the rear side of the bimetal 5 and next to the P.C.T. or the resistance heat material 7 is equipped hereon, and furthermore another phosphor spring plate 6 is mounted to the upper side of the said P.C.T. or the resistance heat material and thereon, the bolt 16 is provided to adjust a closing intensity of said contacts. The spring plate 6 is connected with an electrical lead line to the socket terminal 12 of the motor 19 through the TRIAC 8, and under the bimetal, the fish eyes 4 are rivetted. The bimetal connects to the power source terminal 2 and load side terminal and is moreover connected to the master coil socket terminal 11 through the current transformer 10 used for over current sensing. The one side line of the power source 1 is joined to the common line socket terminal 13 of the motor 19. In this way as the above mentioned circuit is composed.

The driving condenser 18 is connected to the motor input terminal 12 and the power source terminal 3 so as to improve an efficiency of the motor.

Variable resistance 9 is provided so as to provide a current path in parallel with the secondary side of the current transformer 10 and is joined to the gate G and T1 of the TRIAC separately.

Figure 5:
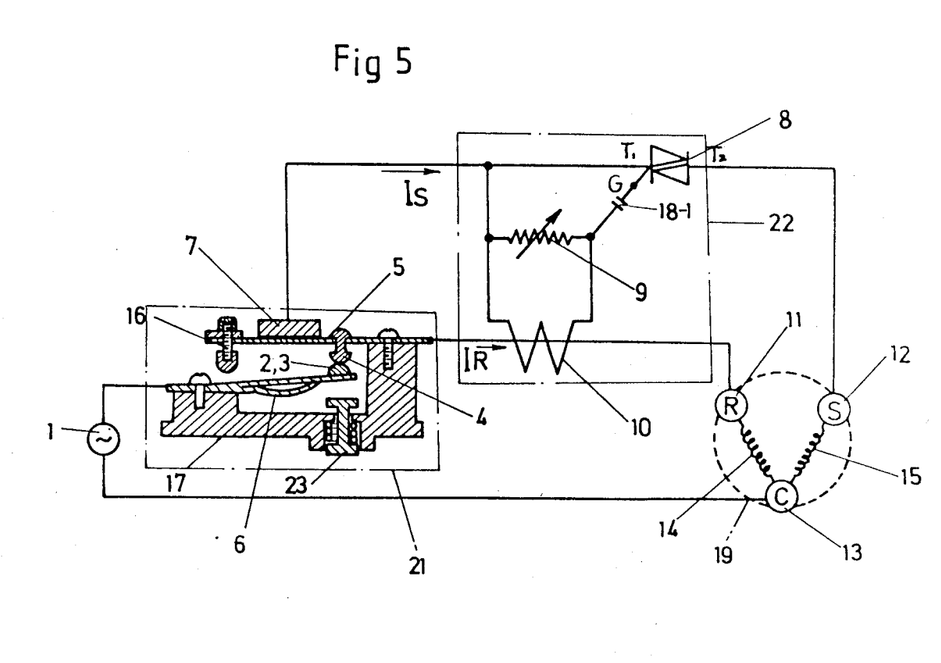
FIG. 5–FIG. 7 are views of other embodiments of the circuit of the present invention is shown.
Figure 6:
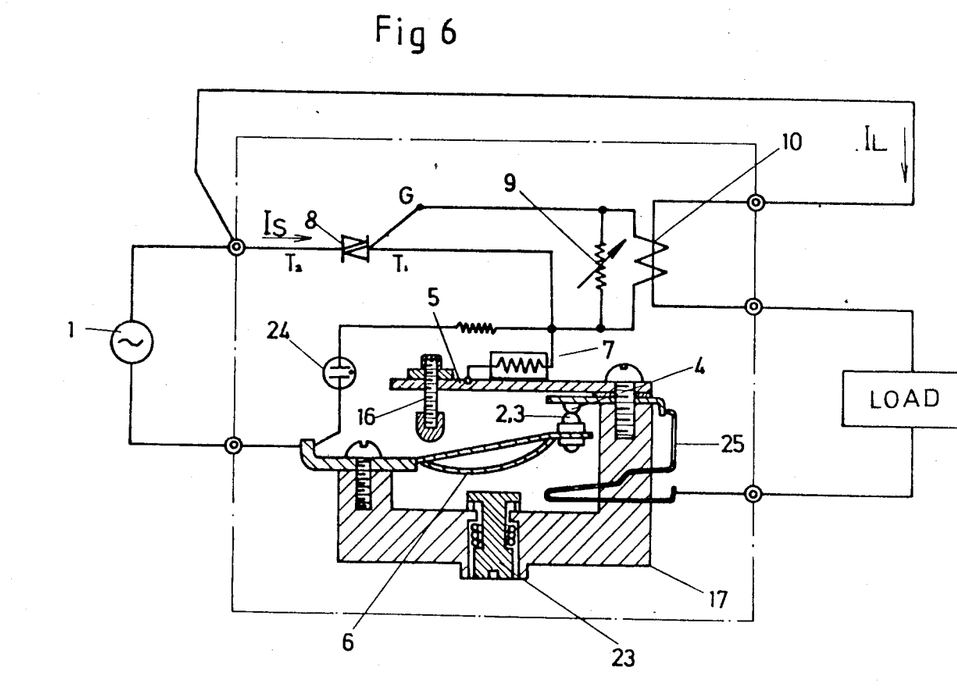
Figure 7:
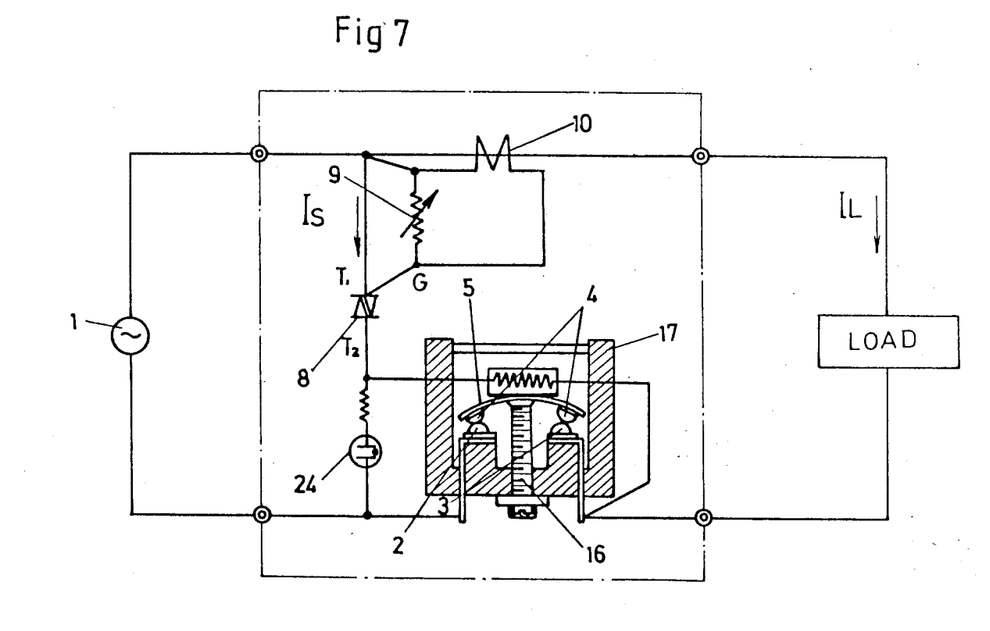
Figure 8:
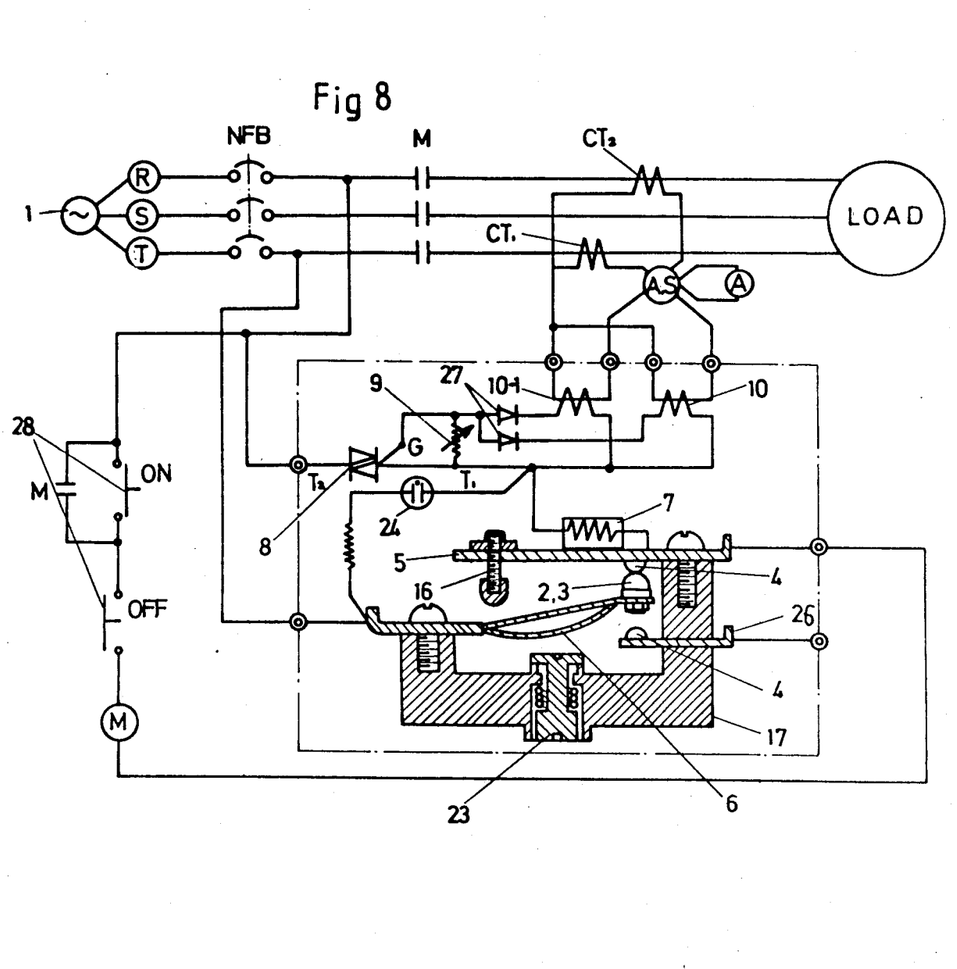
FIG. 8 is a view in which the present invention is utilized in a three-phase motor drive circuit.

Moreover, as shown in the drawings from FIG. 5 to FIG. 8, in an alternative embodiment the structure of the bimetal is transformed as shown in the FIGS. 5 and 6 into a seesaw type, and the over-load circuit breaker shown in the FIG. 5 is formed by fixing one side of the bimetal in which the P.C.T. 7 is connected to a center where the phosphor spring plate 6 and the bolt for controlling operating time 16 are fixed to the synthetic resin frame 17 having a reset button fixed thereon. in the FIG. 6 an example used only for the overload circuit breaker is illustrated. Here, the neon lamp 24 is positioned in parallel to the heat resistance material 7 and if overload movements begins, the neon lamp 24 is illuminated in order to distinguish an overload status, thus allowing users to set the over-load optionally and easily as well as sense it even under a delicate current change like 0.1 A. It is therefore possible to obtain a power saving effect through limiting influence caused by temperature from surrounding elements without flowing load current into the bimetal 5. In the case of an overload caused away from to connect terminals 2, 3 which are settled to the synthetic resin frame and have the fish eyes 4, the bimetal, shown in FIG. 7 is formed to be controlled into ON or into OFF through a way to separate contact 2, 3 from the bimetal 5 with a heat of the resistance heat material (7). In FIG. 8 a practical example for three phase is illustrated, and otherwise the same to the circuit view shown in FIG. 6 differing only with some connecting lines for use of three phase.

Namely, being conscious of a compressor motor used for a freezer, the contact terminal 26 is positioned instead of omitting the coil used to protect the line short-circuit 25, and the current trasformer 10-1 is added hereon because of the three phrase environment. Furthermore, the blocking diode is newly mounted in order to avoid a mutual interference between the current trnasformer 10 and 10-1. Additionally, item 28 is a push button switch and M is the elctronic ON-OFF apparatus.

In operation, the above-mentioned circuit functions as follows.

If the AC power source 1 is connected by the switch 1-1, the master coil current IR flows through an input terminal of the starter apparaus 17 and then through fish eye 4, bimetal 5, fish eye 4, output terminal 3, current transformer 10 the master coil socket terminal 11 of the motor 19 and the common line socket terminal 13.

The starting coil current IS flows the input terminal 2, fish eye 4, the bimetal 5, the phosphor spring plate 6, the P.C.T (Positive Characteristic thermister) 7, the phosphor spring plate 6, TRIAC 8, the starting coil socket terminal of the motor 19, the common live socket terminal 13, but when a rushing current corresponding to about fourfold of a normal operational current occurs at the starting moment of the motor, the TRIAC changes to ON applying the load current more than 130% which is adjusted at the resistance 9 positioned in a secondary side of the current transformer 10, and less than the above said the TRIAC changes to OFF, and according to this principle if the TRIAC is changed to on then the motor is started with application of the current IS, and after starting the TRIAC 8 changes to OFF because of a reduction of the current IR. As a result the starting is ended as the IS is cut off.

Figure 3:
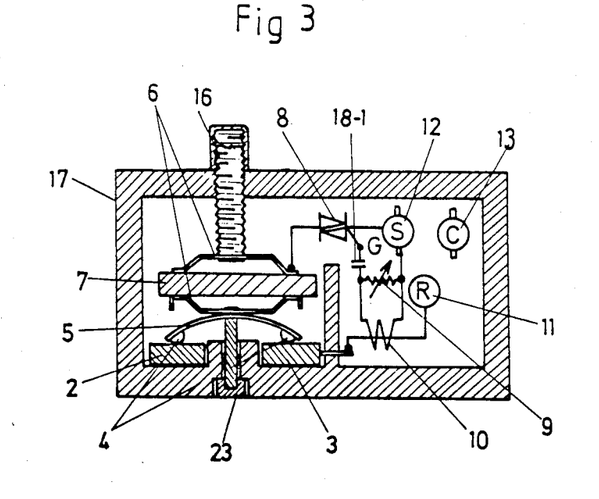
FIG. 3 is a structural view in which the present invention is constructed compactly in order to put it to practical use.
Figure 4:
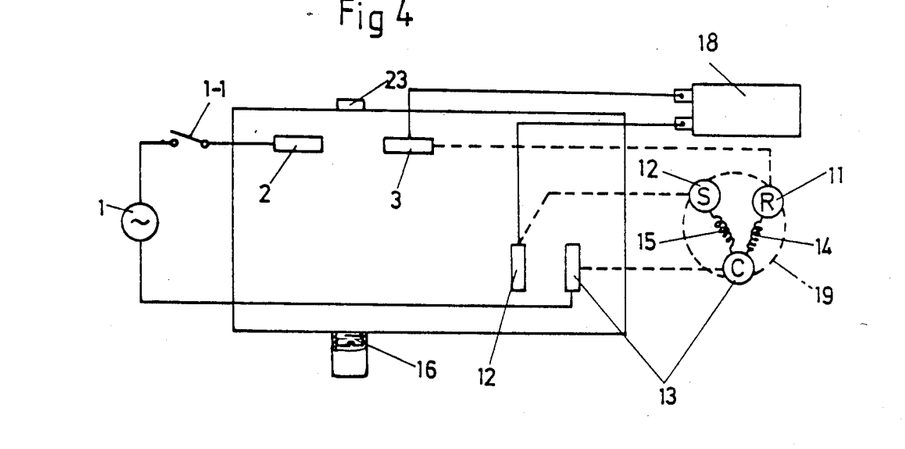
FIG. 4 is the rear view of the starter apparatus shown in FIG. 3.

But if the motor fails to start or becomes overloaded and as a result the current IR is more than 130% a high heat caused from the P.C.T. which is delivered to the bimetal 5. This throws the bimetal 5 after a predetermined time determined by adjustment the control bolt 16 and as a result the fish eye 4 changes to OFF. After the bimetal 5 and the P.C.T 7 are cooled again by a cutting off of the power source the bimetal return automatically to a former condition by means of its structure and the material of the bimetal. If a handoperated style button 23 is provided as in FIG. 3 of the attached drawings it is possible to return to the former condition through hand actuation.

Accordingly, the present invention is a starter apparatus which includes many advantages including (1). In case of operation current flow is entirely stopped in the P.C.T 7 and thus there is no more electric power loss; (2) When current flows is stopped due to an overcurrent condition, cooling begins immediately and restarting is easy; (3) The device of the present invention is compact and the overload apparatus removes the electric power loss perfectly through omitting the heater resistonce 20, this it is economical; (4) the structure is simple and furthermore construction is simple and the external wiring is reduced and as result the production cost is decreased.

The FIG. 9 indicates a circuit view intending to combine a overload sensing apparatus of the present invention with a nonfuse breaker in which a bending of the bimetal 5 is not caused from a heat delivery of a resistance loss of the overload current and where below a established current value there is no heat developed and applied entirely to the bimetal 5. Here only beyond a established current value the bimetal 5 moves in a moment by means of a current less than 1 W according to a over current and finally makes the breaker OFF.

The power source is supplied to the fish eye 4 and the phosphor spring plate 6 by the power source terminal 2 power is supplied to the other side of the power source 1 through the current transformer 10, the load terminal 3 and the load which form a current path. The P.C.T or resistance heat material is adhered to the surface of the bimetal 5 so as to provide a good heat transfer. The bolt used for varying the actuation time 16 is equipped to a top side of the bimetal 5, current transformer of the piercing type 10 is attached to the load terminal 3, and the variable resistance 9, used to establish an overcurrent paths, is connected to a secondary side of the current transformer in parallel and further connected to T1 of the TRIAC 8 and the gate G separately. The indicating lamp 24 (neon or LED) is mounted in parallel to P.C.T or the resistance heat material through the safeguard resistance 30. The one side terminal of the indicating lamp 24 is connected to the power source terminal 2, a second side of the P.C.T or resistance heat material 7 is connected to the bimetal 5, as the breaker apparatus key 41 which is equipped to the machine breaker apparatus 40 pushes the bolt used for moving time control 16 which is bolted to the bimetal 5 to cut off the breaker.

Element 42 is a knob and element 43 is a return spring.

Figure 9:
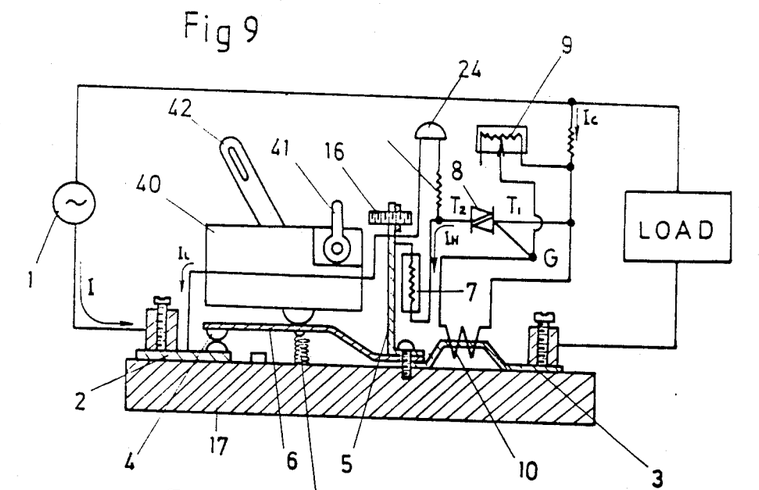
FIGS. 9 and 10 illustrate alternative embodiments of the present invention.
Figure 10:
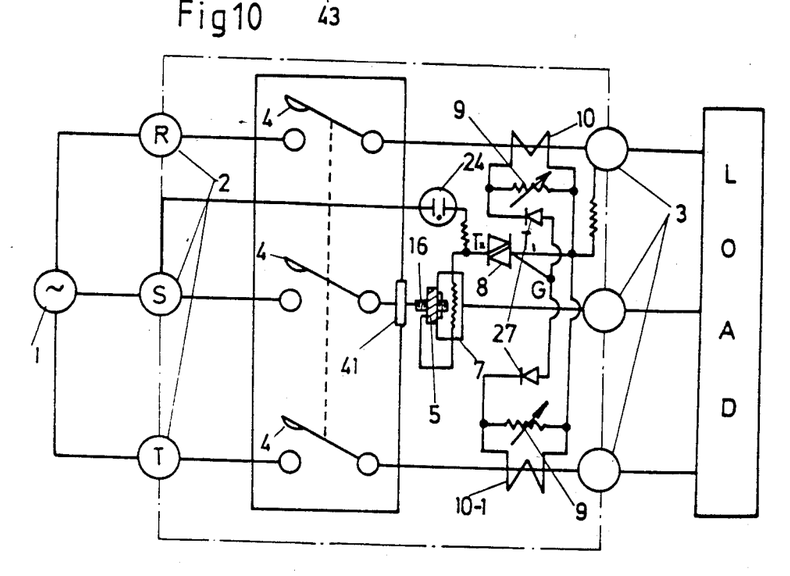

The FIG. 10 shows an example of the preferred embodiment which applies the concepts of the present invention to a three-phase switch and utilizes two current transformer 10 and 10-1 to separately monitor the R-phase and T-phrase and an over current sensing apparatus which is same to the structure shown in the FIG. 9 is provided in the S-phase. A blocking diode is provided in order to avoid a mutual interference between the current transformers, and furthermore the TRIAC 8 and P.C.T or resistance heat material 7 is provided in FIG. 10.

What is claimed is:

1. A starting and thermal overload protection circuit for a motor having at least one main coil and a starter coil arranged in parallel comprising:

a power source having at least first and second power supply terminals, said first power supply terminal serially connected to said motor coils;

overcurrent protection means for protecting said motor from an overcurrent, said overcurrent protection means including, a conductive bimetallic contact support, and at least one moveable contact mounted thereon interacting with a stationary contact, said stationary and moveable contacts and said bimetallic support being serially connected between said second power supply terminal and said main coil to provide power from said power source to said motor, said moveable contacts being normally in contact with said stationary contacts, said bimetallic contact support moving said moveable contact away from said stationary contact when an overcurrent heats said bimetallic contact support; and means for supplying a starting current to said motor coil, said means for supplying including, a positive thermal coefficient resistance mounted in juxtaposition to said bimetallic contact support and electrically connected thereto, a triac serially connected between said positive thermal coefficient resistance and said starter coil for controllably supplying current thereto for motor starting, current sensing means for detecting current supplied said main coil by said power source, means, operatively interconnected between said triac and current sensing means, for gating said triac ON only in response to a detected current substantially greater than the normal current supplied to said main coil during normal operating conditions, and a phase control capacitance interposed between said triac and said means for gating and ensuring substantially complete conduction of said triac when gated ON by said means for gating.

2. The circuit of claim 1 wherein said bimetallic contact support is disc shaped and has first and second moveable contacts disposed on opposing edges thereof; said first and second moveable contacts being in electrical contact with first and second stationary contacts during steady state operation.

3. The circuit of claim 2 wherein said positive thermal coefficient resistance is mounted directly on said bimetallic contact support in an electrically and thermally conductive manner.

4. The circuit of claim 3 wherein said positive thermal coefficient resistance is mounted to said bimetallic contact support by a phosphor bronze spring contact plate rivetted to said bimetallic contact support.

5. The circuit of claim 3 further comprising a bolt for controlling contact tension between said bimetallic contact support and contacts provided thereon and said stationary contacts.

6. The circuit of claim 3 further comprising lamp means connected across said moveable and stationary contacts for displaying an overload condition.

* * * * *